United States Patent [19]

Hekimian

[11] 3,811,088

[45] May 14, 1974

[54] LOGARITHMIC CONVERTER

[75] Inventor: Norris C. Hekimian, Rockville, Md.

[73] Assignee: Hekimian Laboratories, Inc., Rockville, Md.

[22] Filed: Oct. 19, 1972

[21] Appl. No.: 299,139

[52] U.S. Cl. .................. 324/132, 307/229, 328/145

[51] Int. Cl. .......................... G01r 15/10, G06g 7/12

[58] Field of Search ............ 324/132, 111; 328/145; 307/229; 235/197

[56] References Cited

UNITED STATES PATENTS

| | | | |
|---|---|---|---|
| 2,313,666 | 3/1943 | Peterson | 324/132 |
| 3,543,152 | 11/1970 | Niedereder | 324/111 |
| 2,662,213 | 12/1953 | Vanderlyn | 328/145 |
| 3,502,959 | 3/1970 | Stellman | 328/145 |
| 3,537,014 | 10/1970 | Speth | 328/145 |

*Primary Examiner*—Alfred E. Smith
*Assistant Examiner*—Ernest F. Karlsen
*Attorney, Agent, or Firm*—Rose & Edell

[57] ABSTRACT

A logarighmic converter circuit includes an operational amplifier to which an input signal and a reference signal are alternately applied during respective half-cycles of a gating signal. During the input signal half-cycle, the amplifier output signal charges a capacitor through a diode and cuts off an output gate in a meter circuit, the capacitor voltage is degeneratively fed back to the amplifier. During the reference signal half cycle, the amplifier circuit signal reverses polarity, reverse-biasing the diode and closing the output circuit gate, until the capacitor discharges to the reference level. Current flows in the meter circuit only during the capacitor discharge interval which is proportional to the logarithm of the input signal amplitude. The meter movement integrates the current duty cycle to provide a reading of the signal logarithm. The output current may also serve as a gate for a counter fed by timing pulses or for a digital voltmeter to provide a digital output indication.

12 Claims, 4 Drawing Figures

LOGARITHMIC CONVERTER

BACKGROUND OF THE INVENTION

The present invention relates to logarithmic conversion circuits and in particular to circuits of the type which provide analog or digital indications of the amplitude of input signals.

Most logarithmic converters in use today rely on the logarithmic voltage versus current characteristic of semiconductor diodes or transistors. The temperature dependency of these devices requires that the converter circuit include elaborate temperature compensation arrangements. Moreover, compensation must be provided to allow for variations in the characteristics of different semiconductor devices. Even with such compensation the converters are not sufficiently stable for many applications. Further, because of the custom compensation required, the converters tend to be expensive.

It is therefore a primary object of the present invention to provide a logarithmic converter circuit which is relatively inexpensive and independent of both temperature variations and variations in the operating characteristics of different components. In particular, the present invention utilizes the inherently logarithmic discharge characteristic of an RC (resistor-capacitor) circuit to provide the logarithmic characteristic in a logarithmic converter.

Capacitor discharge characteristics have been employed in prior art logarithmic converters; for example, reference is made to U.S. Pat. No. 2,313,666 to Peterson. In Peterson's circuit a capacitor is cyclically charged to the input signal voltage through a gate which is opened for a very small portion of the operating cycle. Upon closure of the gate the capacitor is permitted to discharge through a known resistance until it reaches a sufficiently low level to operate an output gate. The duty cycle of the output gate, which is proportional to the logarithm of the input signal amplitude, is then converted, by means of an integrator, to a DC signal. This signal is then applied to a meter which registers the logarithm of the input signal.

The Peterson approach eliminates temperature effects but is not readily adaptible to present day low-cost circuit components. In particular, operational amplifiers, with their high input impedance, wide signal range and relative independence of power supply variations, are now available in integrated circuit (IC) form at extremely low cost. However, low cost IC operational amplifiers have relatively poor frequency responses. Since the Peterson approach expressly requires sharp-peaked switching signals, the low-cost IC operational amplifiers cannot be employed.

It is therefore another object of the present invention to provide a logarithmic converter which utilizes the logarithmic discharge characteristic of a capacitor yet permits utilization of low-cost IC operational amplifiers.

Another disadvantageous characteristic of Peterson's approach relates to the establishment of a reference level to which the capacitor must discharge from the input signal level. In the Peterson patent the reference level is established by the grid-cathode circuit of a vacuum tube, the characteristics of which can vary from tube to tube. Further, Peterson makes no provision for rendering this reference level adjustable to permit variation of the input signal range. Moreover, the discharge capacitor continues to discharge, even after it actuates the output gate, until the input gate is actuated at the start of the next cycle; thus, the final charge across the capacitor is not the same during each operation cycle. Since Peterson cannot be sure of the charge on the capacitor at the start of each cycle, it is imperative that the rate at which the capacitor charges to the input signal level be extremely fast to assure that the input signal level is reached in sufficient time to permit the capacitor to discharge to the output gate threshold level before the end of the cycle. Again this fast charge rate requires relatively expensive high speed switching elements.

It is therefore another object of the present invention to provide a stable logarithmic converter having an adjustable input signal range and which employs relatively inexpensive low speed switching components.

SUMMARY OF THE INVENTION

According to the present invention, a capacitor is permitted to charge to an input signal level and discharge to an adjustable reference level during respective half cycles of a gating signal. An operational amplifier with inverting and non-inverting input terminals receives the capacitor voltage at one input terminal. The other input terminal receives the input signal and the reference signal during respective half cycles of the gating signal. When the input signal is received, the amplifier output signal is of a polarity which permits it to: (1) charge the capacitor through a diode; and (2) cutoff an output gate. When the reference signal is received the amplifier output signal reverses polarity, cutting off the diode in the charging circuit and actuating the output gate, until the capacitor discharges to the reference level. When the magnitude of the capacitor voltage decays to below the reference voltage, the amplifier output signal reverses polarity again and cuts off the output gate. The output gate, which has a duty cycle proportional to the logarithm of the input signal amplitude, permits current to pass through a meter movement which integrates the gate signal to provide a meter reading proportional to the output gate duty cycle. The gate may also actuate a counter which counts a known clock frequency during each gate pulse interval.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF THE PREFERRED EMBODIMENTS

In the circuit description which follows, the effects of input impedance, bias currents, offsets and output impedances of operational amplifiers are neglected. These parameters can be adjusted to have negligible effect in the circuit by means of well-known design techniques.

Figure 1:
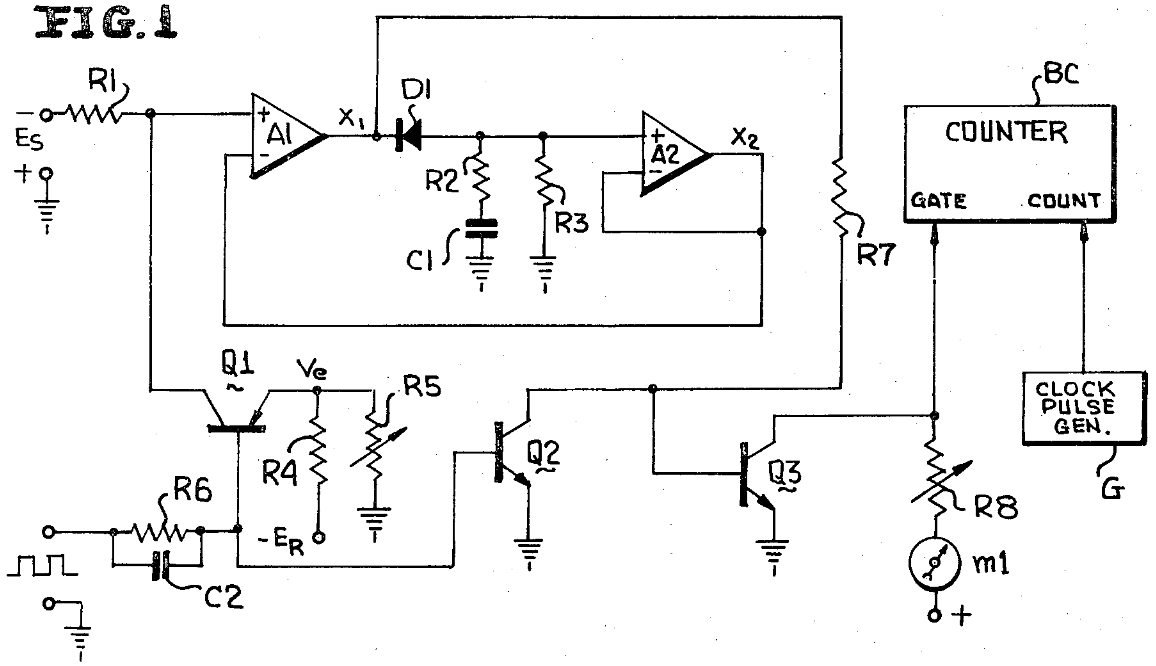
FIG. 1 is a schematic diagram of a logarithmic converter employing the principles of the present invention.

Referring specifically to FIG. 1 of the accompanying drawings, a logarithmic converter includes an operational amplifier A1 having non-inverting (+) and inverting (−) input terminals. An input signal $E_S$, which may be negative DC or bipolar AC, is coupled through resistor R1 to the non-inverting input terminal; also connected to the non-inverting input terminal is the collector of PNP transistor switch Q1. The inverting input terminal of amplifier A1 is connected to the output terminal of a second operational amplifier A2.

The output terminal of amplifier A1 is coupled via resistor R7 to the base of NPN transistor Q3. In addition, the output terminal of amplifier A1 is connected to the cathode of a diode D1. The anode of D1 is connected directly to the non-inverting input terminal of amplifier A2; the anode of D1 is also returned to ground through series-connected resistor R2 and capacitor C1, and through resistor R3.

The output signal from amplifier A2 is fed back to the inverting input terminal of both of amplifiers A1 and A2. If resistor R2 is small compared to R3, the output voltage from amplifier A2 is always substantially equal to the voltage appearing across capacitor C1. This capacitor voltage is thus always applied to the inverting input terminal of amplifier A1.

The emitter of transistor Q1 is provided with a constant reference voltage $V_R$ by means of a voltage divider and a negative voltage supply $E_R$. The voltage divider includes resistor R4 and variable resistor R5, the junction of which is tied to the emitter of Q1. R4 is connected to the negative DC voltage $E_R$; R5 is returned to ground. The reference voltage $V_R$ level is small relative to the range of signal $E_s$ amplitudes to be measured. The base of Q1 receives a square wave gating signal through parallel-connected resistor R6 and capacitor C2. This gating signal is also applied to the base of NPN transistor Q2 which has a grounded emitter and a collector which is connected to the base of Q3.

The collector-emitter path of Q3 is connected in series with a meter circuit between a source of positive voltage and ground. The meter circuit includes meter M1 and variable resistor R8. The meter movement employed in meter M1 has a slow response, relative to the frequency of the gating square wave applied to Q1 and Q2. The collector of Q3 also applies a gating signal to binary counter BC. Count pulses are applied to the counter from clock pulse generator G. The clock pulses are at a substantially higher frequency than the frequency of the gating square wave applied to Q1.

Before describing the overall operation of the circuit of FIG. 1, reference is first made to the operation of amplifiers A1 and A2. Considering amplifier A2 first, assume a relatively high open loop gain of $G_2$ and an output signal designated $X_2$. Then the closed loop equation for amplifier A2 may be expressed as follows:

$$X_2 = G_2\,(V_{C1} - X_2) \qquad (1)$$

where $V_{C1}$ is the voltage across capacitor C1 (assuming R2 << R3). Combining terms in equation (1) results in equation (2):

$$X_2 = G_2 V_{C1}/1 + G_2 \qquad (2)$$

Since $G_2 >> 1$, equation (2) reduces $X_2 \approx V_{C1}$, indicating that amplifier A2, as connected, serves as a unity gain amplifier. Of course, amplifier A2 can be connected to provide constant gain at values other than unity.

Amplifier A1 thus receives signal $V_{C1}$, at its inverting input terminal; either signal $E_s$ or signal $V_R$ is applied to its non-inverting input terminal. When $E_s$ is applied to A1, if the the output signal of A1 is designated $X_1$ and the open loop gain is $G_1$, then the gain equation for amplifier A1 is as follows:

$$X_1 = G_1\,(E_s - V_{C1}) \qquad (3)$$

When diode D1 is forward biased, $X_1 = V_{C1}$. In this mode, equation (3) reduces to $$V_{C1} = G_1 E_s/1 + G_1 \qquad (4)$$

Since $G_1 >> 1$, equation (4) reduces to $V_{C1} = E_s$, indicating that amplifier A1, as connected, operates as a unity gain amplifier. A similar analysis is possible if input signal $E_s$ is replaced by $V_R$, the reference voltage appearing at the emitter of Q1.

Considering now the operation of the overall circuit, when the gating square wave is in its positive half cycle transistor Q1 is cut-off; input signal $E_s$ is thus applied directly to the non-inverting input terminal of amplifier A1. This signal, when negative, appears at the output terminal of Amplifier A1 to forward bias diode D1 and permit capacitor C1 to charge to the peak negative signal level. The values of resistor R2 and capacitor C1 provide a sufficiently short time constant to assure that capacitor C1 can fully charge to the peak of $E_s$ during a half-cycle of the gating signal. Importantly, however, the entire half cycle is dedicated to capacitor charging.

The positive half cycle of the gating signal also results in the forward-biasing of the base-emitter circuit of transistor Q2, thereby rendering Q2 conductive and clamping the base of transistor Q3 to ground. Q3 is thus maintained cut-off during the positive half cycle of the gating signal, and no current passes through meter M1 at this time.

During the negative half-cycle of the gating signal, transistor Q1 is turned on. It is assumed that variable resistor R5 is very much smaller than resistor R4; therefore the relatively low negative reference voltage appearing at the emitter of Q1 is applied to the non-inverting input terminal of Amplifier A1. The reference voltage is of smaller magnitude than $E_s$, the voltage to which capacitor C1 has been charged. Consequently the output signal from amplifier A1 changes polarity, becoming a large positive voltage. Diode D1 is reverse biased by this signal and capacitor C1 is thus permitted to discharge exponentially through resistors R2 and R3. The discharge continues until the voltage across capacitor C1 reaches the reference voltage, at which time the output signal from amplifier A1 becomes negative once again. Diode D1 is thus once again forward biased and the voltage across capacitor C1 is held at the reference voltage level for the remainder of the negative half cycle of the gating signal. It is assumed, of course, that the discharge time constant for capacitor C1 through resistors R2 and R3 is short enough to permit the capacitor voltage to reach the reference level during one half cycle of the gating signal.

The negative half cycle of the gating signal also results in transistor Q2 becoming cut-off. This removes the ground clamp from the base of Q3 and permits the latter to conduct as long as the output signal from amplifier A1 is positive. As described above, the output signal from A1 is positive during the discharge period of capacitor C1 from $E_s$ to the reference level; and this period is exponentially related to the difference between $E_s$ and the reference level. Current therefore passes through Q3, and meter M1, for a period of time during each gating cycle which is proportional to the logarithm of the input signal $E_s$. The movement of meter M1 has the effect of integrating the periodic current pulses (i.e. - one per gating signal cycle) therethrough and thus provides a steady reading representative of the logarithm of the input signal.

Figures 2, 3, 4:
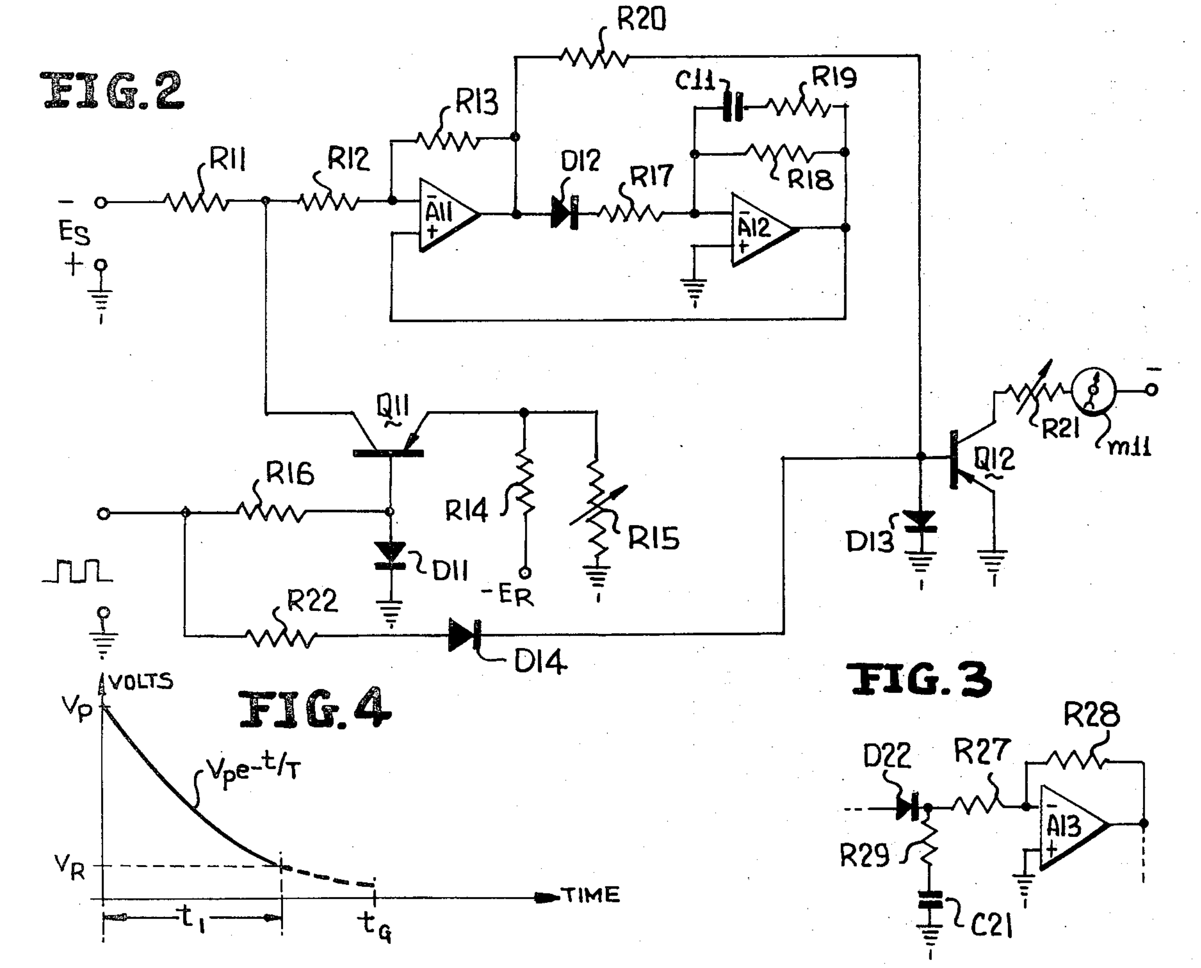
FIG. 2 is a schematic diagram of a second embodiment of the present invention.
FIG. 3 is a schematic diagram of a circuit representing a modified segment of the circuit of FIG. 2.
FIG. 4 is a plot of voltage versus time illustrating the waveform of a signal generated in the circuit of FIG. 1.

The operation of the circuit of FIG. 1 during the negative half cycle of the gating signal is graphically represented in FIG. 4 by the waveform of the voltage across capacitor C1. The waveform is illustrated as a positive decaying voltage for ease in reference since only relative magnitudes need be considered for purposes of analysis and since the circuit of FIG. 1 can be readily modified to respond to positive input signals.

Referring to FIG. 4, it is assumed that capacitor C1 has charged to a peak voltage of $V_p$. When the gating signal applied to the base of Q1 becomes negative, C1 discharges in the manner described as an exponential function determined by the time constant, T, of the discharge path. This discharge may be expressed as follows:

$$V_{C1} = V_p e^{-t/T}. \quad (5)$$

If the time required for the capacitor voltage ($V_{C1}$) to discharge from $V_p$ to the reference voltage $V_R$ is designated $t_1$, then $$V_R = V_p e^{-t_1/T}. \quad (6)$$

Solving for $t_1$ in equation (6):

$$t_1 = T(\ln V_p) - T(\ln V_R). \quad (7)$$

Since $V_R$ is a constant, it is thusly observed that $t_1$ varies as a function of the logarithm of $V_p$, the peak voltage of input signal $E_s$. As described above, current is supplied to meter M1 only during the discharge interval of C1 (i.e.,: $t_1$). Thus, upon integration of the current by the meter movement, the meter registers a value proportional to the logarithm of the peak value of $E_s$.

Referring again to FIG. 1, counter BC is gated on to count clock pulses from clock pulse generator G whenever transistor Q3 conducts (i.e., — during interval $t_1$). The clock pulse count is therefore a measure of the discharge time for capacitor C1. Since this time is proportional to the logarithm of the peak value of input signal $E_s$, by proper choice of clock pulse frequency the counter readout may be calibrated to register the logarithm of the input signal voltage.

Transistor Q2 serves the function of preventing actuation of Q3 (and the meter) during the positive half cycle of the gating signal should the input signal magnitude fall below the reference level.

Typical component values for the circuit of FIG. 1, not to be construed as limiting upon the scope of the invention, are listed in Table I.

TABLE I

| Component | Value |
|---|---|
| R1 | 43K ohms |
| R2 | 68 ohms |
| R3 | 27K ohms |
| R4 | 3K ohms |
| R5 | 200 ohms |
| R6 | 9.1K ohms |
| R7 | 100K ohms |
| R8 | 500K ohms |
| C1 | 0.01 uf |
| C2 | 0.001 uf |

For the component values listed in Table I, a gating signal having a frequency of 100 Hz is suitable.

It should also be mentioned that a digital voltmeter can be connected to the gate output of the collector of Q3 to provide a digital readout of the input signal logarithm. Various other modifications may be employed, as desired. For example, if it is desired to achieve gain limitation at amplifier A1, a suitable negative feedback resistor may be employed between the output and inverting input terminals of that amplifier and another suitable resistor could be inserted in the feedback path from amplifier A2 to amplifier A1. Moreover, the discharge circuit could be modified, if desired, by placing resistor R3 directly across capacitor C1 instead of the series combination of R2 and C1, as shown.

An important aspect of the circuit of FIG. 1 is the dual use of amplifier A1 as both an output gate (Q3) driver and as means for charging capacitor C1. In effect, amplifier A1, in conjunction with transistor Q1, alternately receives the input signal and reference voltage. In this regard, Q1 and R1 may be replaced with a single-pole double-throw switch which alternately connects the input and reference voltages to the non-inverting input terminal of amplifier A1. The reference level is adjustable and remains constant from cycle to cycle. Moreover, discharge of capacitor C1 terminates once the reference level is reached so that subsequent charging of the capacitor proceeds from the same initial level during each positive half cycle of the gating signal.

Diode D1 is important in that it essentially decouples the discharge circuit from amplifier A1 during discharge of C1. Amplifier A2, as connected, serves as a high-impedance unity gain buffer amplifier which prevents loading of the discharge circuit by amplifier A1 in the discharge mode. If a high-performance, high input impedance amplifier is employed for A1, then A2 is not required; however, such an amplifier is relatively expensive and must maintain a high input impedance even when diode D1 is reverse-biased. The preferred less-costly embodiment requires that A2 be included.

The present invention may also employ inverting, rather than non-inverting, amplifiers. Such an embodiment is illustrated in FIG. 2 of the accompanying drawings. The negative input signal, $E_s$, is applied to the inverting input terminal of operational amplifier A11 through series-connected resistors R11 and R12. Negative feedback from the output terminal to inverting input terminal of amplifier A11 is provided by resistor R13. The output terminal of A11 is also connected to the anode of diode D12 which has its cathode coupled to the inverting input terminal of amplifier A12 through resistor R17.

Negative feedback for amplifier A12 is provided by resistor R18 connected in parallel with the series combination of resistor R19 and capacitor C11. The non-inverting input terminal of amplifier A12 is grounded; its output terminal is connected to the non-inverting input terminal of A11.

The output terminal of amplifier A11 is coupled via resistor R20 to the base of output gate PNP transistor Q12. The base of Q12 is clamped to ground in a positive sense by diode D13; the emitter of Q12 is grounded; the collector is connected in series with variable resistor R21, meter M11, and a negative voltage.

The junction between resistors R11 and R12 is coupled to the collector of PNP transistor Q11, the emitter of which is coupled to negative voltage source $-E_R$ through resistor R14 and to ground through adjustable resistor R15. The base of Q11 is clamped to ground in a positive sense by diode D11. A gating square wave is applied to the bases of Q11, through resistor R16, and Q12, through resistor R22 and diode D14.

The operation of the circuit of FIG. 2 is substantially similar to that of the circuit of FIG. 1. Amplifiers A11 and A12, as connected, operate as unity gain inverting amplifiers; consequently diode D12 is poled opposite to diode D1 in FIG. 1 and capacitor C11 discharges as did C1 in FIG. 1. Resistor R13 is not essential but may be employed to limit the gain of amplifier A11 in the negative output condition. The signal at the collector of Q12 may be utilized to gate a counter or digital voltmeter as described in relation to Q3 in FIG. 1.

The position of the RC circuit (elements C11, R18) in the negative feedback circuit of amplifier A12 is merely a matter of design choice. The RC circuit may be positioned in a manner analogous to that in FIG. 1. The charging path for capacitor C11 includes diode D12 and resistor R17 and R19; the discharge path for C11 includes resistors R18 and R19, it being understood that R19 is much smaller than R18.

An alternate connection for the RC circuit of FIG. 2 is illustrated in FIG. 3. The charging capacitor C21 is referenced to ground and is charged through diode D22 and relatively small resistor R29, it being understood that diode D22 corresponds to diode D12 of FIG. 2. Resistor R27 is connected between the cathode of D22 and the inverting input terminal of A12; resistor R28 is connected in the negative feedback path for A12. The discharge path for C21 includes resistors R29 and R27.

It will be apparent to those skilled in the art that input signals of positive polarity may be logarithmically converted by the circuits of FIGS. 1 and 2 by simply changing the polarities of the reference voltage, diodes, and transistors.

While I have described and illustrated specific embodiments of my invention, it will be clear that variations of the details of construction which are specifically illustrated and described may be resorted to without departing from the true spirit and scope of the invention as defined in the appended claims.

I claim:

1. A logarithmic converter circuit for providing an indication of the logarithm of the amplitude of an input voltage signal, said circuit comprising:

an operational amplifier including inverting and non-inverting input terminals and an output terminal, wherein the voltage at said output terminal is of one polarity when the voltage at one of said input terminals exceeds the voltage at the other of said input terminals, and is of opposite polarity when the voltage at said other input terminal exceeds the voltage at said one input terminal;

a source of gating signal of constant frequency and which alternates between first and second gating levels during first and second cycle portions, respectively;

means for providing a D.C. reference voltage which is smaller in magnitude than the peak voltage of said input signal;

input gating means responsive to said gating signal for rendering the voltage at said one input terminal of said operational amplifier equal to the input voltage during said first cycle portion of said gating signal and equal to said reference voltage during said second cycle portion of said gating signal;

a storage capacitor;

feedback means for applying the voltage appearing across said storage capacitor to said other of said input terminals of said operational amplifier;

further gating means responsive to the voltage at said output terminal having said one polarity for coupling said storage capacitor to said output terminal in charging relationship, and responsive to the voltage at said output terminal having said second polarity for decoupling said storage capacitor from said output terminal;

a discharge path connected to permit exponential decay of the voltage across said storage capacitor when said storage capacitor is decoupled from said output terminal, said discharge path and said capacitor having a time constant which is sufficiently short to permit the voltage across said storage capacitor to discharge from the peak voltage of said input signal to said reference voltage within a half-cycle of said gating signal; and output means responsive to said voltage at said output terminal having said second polarity for providing an indication which varies in proportion to the logarithm of the peak voltage of said input signal.

2. The circuit according to claim 1 wherein said output means comprises:

a source of supply voltage;

a meter; and output gating means actuable in response to the voltage at said output terminal having said second polarity for providing a current path for said source of supply voltage through said meter;

wherein said meter includes a meter movement which has a slow response relative to the frequency of said gating signal.

3. The circuit according to claim 1 wherein said output means includes:

a gated binary counter;

a source of clock pulses having a substantially higher frequency than said gating signal; and means for applying said clock pulses to said binary counter; and output gating means responsive to the voltage at said output terminal of said operational amplifier having said second polarity for gating said binary counter into a counting mode wherein said clock pulses are counted.

4. The circuit according to claim 1 wherein said further gating means comprises a diode connected to pass current between said storage capacitor and said output terminal of said operational amplifier when the voltage at said output terminal has said one polarity.

5. The circuit according to claim 1 wherein said input gating means comprises a transistor having a collector coupled to said one input terminal of said operational amplifier, an emitter coupled to said reference voltage, and a base coupled to said source of gating signal.

6. The circuit according to claim 1 wherein said feedback means comprises a second operational amplifier connected for applying the voltage from across said storage capacitor to said other input terminal.

7. The circuit according to claim 1 further comprising means for selectively adjusting the level of said reference voltage.

8. The circuit according to claim 1 wherein said one input terminal corresponds to said non-inverting input terminal and said other input terminal corresponds to said inverting input terminal.

9. A logarithmic converter circuit for providing an output signal having a parameter proportional to the logarithm of the amplitude of an input voltage, said circuit comprising:

first and second operational amplifiers, each having first and second input terminals of opposite polarity and an output terminal;

means for coupling the output terminal of said second operational amplifier to the second input terminals of said first and second operational amplifier;

means for providing a reference voltage;

gating means for successively and alternately rendering the voltage at said first input terminal of said first operational amplifier equal to said input and reference voltages;

a charging capacitor and discharge resistance connected in parallel and to the first input terminal of said second operational amplifier;

a diode connected in series between the output terminal of said first operational amplifier and the first input terminal of said second operational amplifier, said diode being poled to conduct current flow between the output terminal of said first operational amplifier and said capacitor when the voltage at said output terminal of said first operational amplifier is of greater magnitude than the voltage across said capacitor, and to decouple said capacitor from the output terminal of said first operational amplifier when the voltage across said capacitor if of greater magnitude than the voltage at the output terminal of said first operational amplifier; and output means connected to the output terminal of said first operational amplifier for providing said output signal.

10. The circuit according to claim 9 wherein said output means comprises means for providing an indication proportional to the logarithm of the amplitude of said input signal in response to time interval required for the voltage across said capacitor to discharge from the amplitude of said input signal to said reference voltage.

11. The circuit according to claim 9 wherein said output means comprises means operative when the voltage at said first input terminal of said first operational amplifier is rendered equal to said reference voltage for providing an output signal when the magnitude of the voltage at said second input terminal of said first operational amplifier is greater than the magnitude of the voltage at said output terminal of said first operational amplifier.

12. A logarithmic converter circuit comprising:

an operational amplifier of the differential type having first and second input terminals and an output terminal at which is provided an amplified voltage proportional in amplitude and polarity to the difference voltage across said first and second input terminals;

a source of input voltage;

a source of reference voltage;

gating means for alternately rendering the voltage at said first input terminal equal to said input voltage and said reference voltage;

a capacitor and resistor connected in parallel;

feedback means for applying to said second input terminal a voltage proportional to the voltage across said capacitor;

gating means for coupling said output terminal to said parallel-connected resistor and capacitor when the voltage at said output terminal is of greater magnitude than the voltage across said capacitor and for decoupling said resistor and capacitor from said output terminal when the voltage across said capacitor is of greater magnitude than the voltage at said output terminal;

whereby the voltage across said capacitor is discharged through said resistor when said resistor and capacitor are decoupled from said output terminal by said gating means but tends to follow the voltage at said output terminal when said resistor and capacitor are coupled to said output terminal; and whereby the duty cycle of said gating means represents a measure of the logarithm of the amplitude of said input voltage.

* * * * *